United States Patent [19]
Rodgers

[11] 3,860,271
[45] Jan. 14, 1975

[54] BALL JOINT PIPE COUPLING
[76] Inventor: Fletcher Rodgers, Alva, Okla. 73717
[22] Filed: Aug. 10, 1973
[21] Appl. No.: 387,441

[52] U.S. Cl. .................... 285/97, 277/34, 285/261
[51] Int. Cl. ............................................. F16l 27/06
[58] Field of Search ................. 285/97, 261, 270; 277/34.3, 34

[56] References Cited
UNITED STATES PATENTS

| 409,277 | 8/1889 | Curley | 285/270 |
|---|---|---|---|
| 922,075 | 5/1909 | Bates | 285/97 |
| 1,906,575 | 5/1933 | Goeriz | 285/270 |
| 3,236,544 | 2/1966 | Brown | 285/97 |
| 3,383,122 | 5/1968 | Richarson | 285/261 X |

FOREIGN PATENTS OR APPLICATIONS

| 440,040 | 4/1912 | France | 285/261 |
| 561,995 | 5/1957 | Italy | 285/261 |
| 933,426 | 10/1955 | Germany | 285/270 |

Primary Examiner—Thomas F. Callaghan
Attorney, Agent, or Firm—William S. Dorman

[57] ABSTRACT

A ball and socket joint or coupling for securing tubular members in end-to-end relation, said coupling comprising a first element having a substantially spherical portion for disposition within a complementary recess in an outer element to secure the tubular members together. Inflatable sealing means is interposed between the elements for efficiently precluding leakage of fluid therebetween.

2 Claims, 2 Drawing Figures

PATENTED JAN 14 1975 3,860,271

BALL JOINT PIPE COUPLING

BACKGROUND OF THE INVENTION

1. Field of the Invention

This invention relates to improvements in pipe couplings and more particularly, but not by way of limitation, to a coupling for connecting adjacent ends of tubular members and efficiently sealing the joint therebetween.

2. Description of the Prior Art

Tubular members or pipe sections, and the like, are usually connected in tandem relation by coupling members which are utilized for securing the ends of the adjacent pipe sections in longitudinal alignment. It is normally desirable to provide a seal between the adjacent pipe sections in order to preclude leakage of fluid at the pipe joint, and in the event the pipe joint is disposed in a liquid, such as under water, it is extremely important that the seal at the joint be sufficient not only for precluding leakage of fluid from the pipeline, but also for precluding seepage of liquid into the pipeline.

SUMMARY OF THE INVENTION

The present invention contemplates a novel coupling for pipe sections and the like wherein a ball and socket type joint is provided for connection the pipe sections in end-to-end relation. An inner element having a substantially spherical or ball shaped portion on one end thereof and a shank member on the opposite end thereof is adapted for insertion within an outer element having a complementary spherical recess therein. The inner and outer elements are provided with aligned bores extending longitudinally therethrough for receiving the ends of adjacent pipe sections therein for connecting the pipe sections in end-to-end relation. In addition, an inflatable sealing member or bladder is interposed between the inner and outer elements for efficiently precluding leakage of fluid at the pipe joint.

DESCRIPTION OF THE PREFERRED EMBODIMENT

Figure 1:
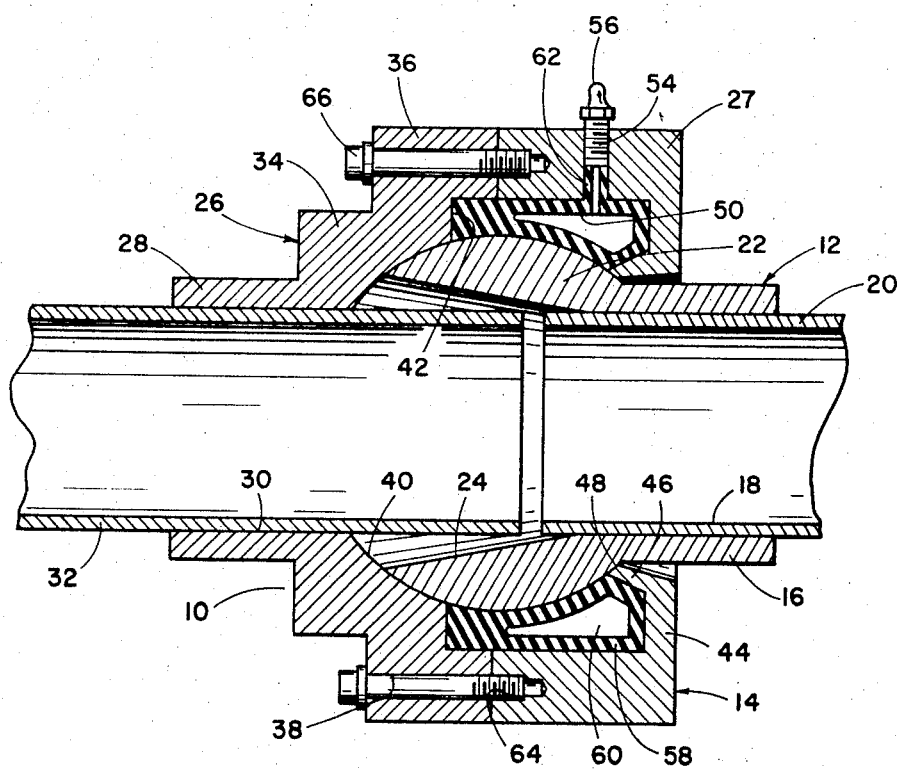
FIG. 1 is a sectional elevational view of a ball joint pipe coupling embodying the invention, with a pair of adjacent pipe ends depicted therein.
Figure 2:
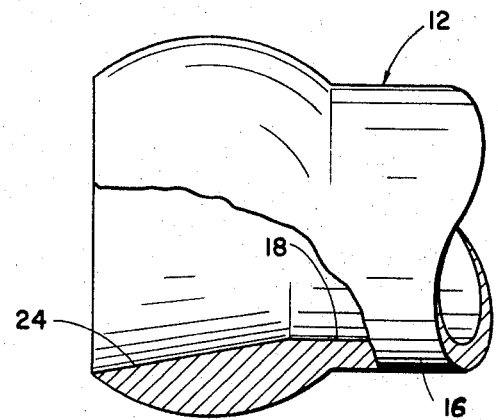
FIG. 2 is a side elevational view, partly in section, of the inner element of a pipe coupling embodying the invention.

Referring to the drawings in detail, reference character 10 generally indicates a ball joint pipe coupling comprising an inner element 12 and an outer element 14. The inner element 12 comprises a sleeve portion 16 having a central bore 18 extending longitudinally therethrough for receiving one end of a pipe section 20 therein. The sleeve 16 is enlarged at 22 and the outer periphery thereof is substantially sphercal or ball shaped as clearly shown in the drawings. The bore 18 is flared outwardly at 24 in the proximity of the spherical portion 22 for a purpose as will be hereinafter set forth.

The outer element 14 is preferably of a two-piece construction for facilitating assembly of the coupling 10, and as shown herein comprises a first section 26 and a second section 27 disposed in abutting relationship. The first section 26 comprises a sleeve 28 provided with a central bore 30 extending longitudinally therethrough for receiving one end of a pipe section 32 therein. The sleeve 28 is enlarged at 34 and provided with an outwardly extending circumferential flange 36 having a plurality of circumferentially spaced bores 38 extending longitudinally therethrough for a purpose as will be hereinafter set forth. In addition, the bore 30 is enlarged at 40 to provide a spherical or arcuate recess of a configuration complementary to the outer periphery of the spherical portion 22. The spherical recess 40 is provided with an annular shoulder 42 spaced from the bore 30 to provide an annular cavity between the section 26 and the spherical portion 22 in the assembled position of the coupling 10, as will be hereinafter set forth.

The section 27 is substantially cylindrical and the outer diameter thereof is preferably the same as the outer diameter of the flange 36, but not limited thereto. In addition, the inner diameter of the section 27 is preferably equal to the diameter of the annular recess formed by the shoulder 42, as particularly shown in FIG. 1. The outer end of the cylindrical section 27 is provided with an inwardly directed circumferential shoulder or flange 44 which terminates in an angularly inwardly directed or tapered sleeve portion 46. The inner end or tip 48 of the sleeve portion 46 is arcuate or spherical complementary to the outer periphery of the spherical portion 22 and is adapted to engage the outer periphery thereof in the assembled position of the coupling 10. Of course, it will be apparent that an annular chamber 50 is provided around the spherical portion 22 and within the cylindrical section 27 in the assembled position of the coupling 10, as shown in FIG. 1.

A bore 52 is provided in the sidewall of the cylindrical section 27 to provide communication between the exterior thereof and the chamber 50. The bore 52 is preferably threaded as shown at 54 for receiving a suitable grease fitting 56, such as commonly known as a zerk fitting, or the like, for a purpose as will be hereinafter set forth. A yieldable sealing member or bladder 58 is disposed within the chamber 50, as shown in FIG. 1. The bladder 58 is preferably generally similar to that shown in my co-pending application Ser. No. 199,585, filed Nov. 17, 1971, and entitled "Pipe Coupling", and as shown herein is provided with an internal chamber 60 for receiving a fluid therein. The bladder 58 may be constructed in any suitable manner, such as set forth in the aforementioned application, and is provided with a suitable valve 62 generally similar to the usual valve provided in a tire innertube. As best shown in FIG. 1, the bladder 58 is provided with an inner contoured surface complementary to the outer periphery of the spherical portion 22 and engagable therewith. The valve 62 extends into the bore 54 and into communication with the fitting 56 whereby a suitable fluid may be injected into the chamber 60 of the bladder 58.

The cylindrical section 27 is provided with a plurality of circumferentially spaced bores 64 extending longitudinally into the end thereof oppositely disposed from the flange 44, and disposed in substantial alignment with the bores 38 of the section 26. The bores 64 are preferably threaded, as shown in FIG. 1 whereby suitable bolts 66 may be inserted through each bore 38 and threadedly engaged with the aligned respective bore 64 in order to secure the sections 26 and 27 together. It will be apparent from an inspection of FIG. 1 that the annular chamber formed by the shoulder 42 and the annular chamber 50 are in open communication in the assembled position of the sections 26 and 27, and the yieldable sealing member or bladder 58 fills both these chambers in the assembled position of the coupling 10.

In order to couple or connect the pipe sections 20 and 32 in end to end relation, as shown in FIG. 1, it is preferable to initially insert the inner section 12 within the half section 27 of the outer section 14 and properly install the bladder 58 within the chamber 50 and position the valve 62 in the bore 54. The sleeve 16 of the inner section 12 may then be disposed on the end of one pipe section, such as the section 20, and the sleeve 28 of the halfsection 26 may be similarly disposed on the adjacent end of the other pipe section, such as the pipe section 32. Of course, it will be apparent that suitable sealing members, such as O-rings, or the like, (not shown) may be interposed between each sleeve 16 and 28 and the respective pipe sections 20 and 32 in order to preclude leakage of fluid therebetween, as is well known.

The two half sections 26 and 27 of the outer section 14 may then be secured together by placing the flange 36 in abutment with the outer end of the cylindrical section 27 and inserting the bolts 66 through the aligned bores 38 and 64. It will be apparent that the flared portion 24 of the bore 18 will facilitate the insertion of the end of the pipe section 32 into the inner section 12. It is to be noted that, whereas it may be preferable to insert the pipe sections within the respective portions of the coupling 10 a sufficient distance for engagement of the ends of the pipe sections against each other, it is not necessary to do so since the bladder 58 provides an efficient sealing of the coupling 10.

When the half sections 26 and 27 have been secured together, a suitable fluid, such as packing grease, or the like, may be injected into the chamber 60 through the fitting 56, as is well known, and may be sealed within the chamber 60 by closing the fitting 58 and valve 54, as is well known. The sealing pressure of the bladder 58 will thus be maintained for sealing the pipe joint. It will be apparent that the force of the fluid within the chamber 60 inflates the bladder 58 outwardly in all directions for providing a tight sealing engagement between the bladder 58 and the inner section 12 and outer section 14 at all times as long as the fluid is retained within the chamber 60. In addition, the bladder 58 exerts a force on the spherical portion 22 of the inner section 12 for securely retaining the inner section 12 in the engaged position within the outer section 14. The coupled pipe sections 20 and 32 may be installed at the desired site, as is well known, and may remain in position as desired for service. In the event it becomes necessary, additional fluid may be inserted into the chamber 60, of course, for increasing the sealing efficiency of the coupling 10.

In the event it becomes necessary to remove the pipe sections 20 and 32 from the coupling 10 for any reason, of course, the fluid may be removed or withdrawn from the chamber 60 whereby the bladder 58 will become deflated, thus releasing the pressure on the spherical portion 22 and permitting a separation of the inner section 26 from the outer section 14. The half sections 26 and 27 may be released from mutual engagement by removing the bolts 66, thus permitting a separation of the outer section 14 in order that the coupling 10 may be disengaged and removed from the ends of the adjacent pipe sections 20 and 32.

From the foregoing it will be apparent that the present invention provides a novel ball joint pipe coupling particularly designed and constructed for quickly and efficiently securing pipe sections in end-to-end sealed relationship. The novel coupling comprises inner and outer ball joint coupling elements having an inflatable bladder interposed therebetween for securing the coupling elements in the engaged position therebetween and for efficiently sealing the pipe joint for precluding leakage of fluid. The novel coupling is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A ball joint coupling comprising an inner element having a sleeve portion with an enlarged spherical portion at one end thereof, said inner element having a central bore extending longitudinally therethrough for receiving the end of one pipe section therein; an outer element having a flanged sleeve member with a central bore extending therethrough for receiving the end of a second pipe section therein, said outer element also including a cylindrical member having an inner end removably secured to the flanged sleeve member; said flanged sleeve member and said cylindrical member providing a spherical recess for receiving the spherical portion in said outer element, said flanged sleeve member and said cylindrical member being provided with cooperating annular recesses to provide an annular recess surrounding the spherical portion in the engaged position of the coupling, the outer end of said cylindrical member having an inwardly directed circumferential flange terminating in an inwardly directed and tapered sleeve portion, the inner end of said tapered sleeve portion being spherically shaped complementary to the outer periphery of the spherical portion and engaging said outer periphery in the engaged position of the coupling; a yieldable sealing member disposed in said annular recess and surrounding the spherical portion in the engaged position of the coupling, said yieldable sealing member being provided with an inner contoured surface engaging said spherical portion, said yieldable sealing member being provided with an internal chamber for receiving a pressure fluid therein, valve means provided on said yieldable sealing member for admitting fluid into the internal chamber, means provided in said cylindrical member in communication with said valve means for selectively injecting said fluid into the internal chamber whereby said yieldable sealing member exerts pressure on said spherical portion for retaining the engaged position for the coupling and providing an efficient sealing of the joint between the pipe sections.

2. A ball joint pipe coupling as set forth in claim 1 wherein the central bore of the inner element is provided with an outwardly flared portion for receiving the end of said second pipe section therein in the engaged position of the coupling.

* * * * *